United States Patent Office 3,245,988
Patented Apr. 12, 1966

3,245,988
STEROID [2,3-C] FURAZAN COMPOUNDS AND THE PROCESS FOR THE PRODUCTION THEREOF
Genkichi Ohta, Bunkyo-ku, Tokyo-to, Toshio Takegoshi, Ichikawa-shi, Takeshi Onodera, Koto-ku, Tokyo-to, Akira Kasahara, Ichikawa-shi, Yasuo Oshima, Kunitachi-machi, Kitatama-gun, Tokyo-to, Masao Shimizu, Bunkyo-ku, Tokyo-to, and Katsujiro Ueno, Kita-ku, Tokyo-to, Japan, assignors to Daiichi Seiyaku Kabushiki Kaisha, Chuo-ku, Tokyo-to, Japan, a joint-stock company of Japan
No Drawing. Filed Mar. 9, 1964, Ser. No. 350,585
Claims priority, application Japan, Apr. 10, 1963, 38/18,867; July 15, 1963, 38/38,456; Dec. 5, 1963, 38/65,465; Feb. 12, 1964, 39/7,283
18 Claims. (Cl. 260—239.55)

This invention relates to novel steroid (2,3-C)furazan compounds and to a process for the production thereof. The compounds of this invention are useful as medicine because of their excellent anabolic activity and are represented by the following general formula:

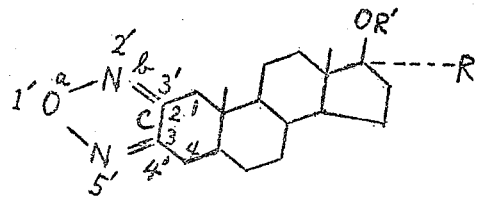

wherein R represents a hydrogen atom or a methyl group and R' represents a hydrogen atom or an acyl residue of a hydrocarbon carboxylic acid having less than 16 carbon atoms.

The compounds shown by the above formula are androstano(2,3-C)furazan derivatives that have a structure in which the steroid nucleus contains a hydroxyl group or an acylated hydroxyl group plus a hydrogen atom or a methyl group at the 17-position of 5α-androstane, and 2- and 3-positions of the steroid are fused to 3'- and 4'-positions of a furazan nucleus ring, that is, 1',2',5'-oxadiazol nucleus ring. The term acyl group herein means an acyl residue of an organic acid having less than 16 carbon atoms. The organic acid is any acid such as, for example, acetic acid, propionic acid, butyric acid, n-heptanoic acid, n-decanoic acid, palmitic acid, benzoic acid, phenylpropionic acid, cyclohexylpropionic acid, and succinic acid.

The 17β-hydroxy- or 17β-acyloxy-5α-androstano(2,3-C)furazan compounds of this invention were found to have potent anabolic and weak androgenic activity. The anabolic activity can be estimated by the myotropic activity on immature castrated male rats. For example, the following results were obtained with respect to the activities of representative compounds of this invention.

In subcutaneous assay, 17β-hydroxy-17α-methyl-5α-androstano(2,3-C)furazan had 1 to 1.5 times the myotropic and 0.2 to 0.3 times the androgenic activity of testosterone propionate. In oral assay, it had 5.6 times the myotropic and 0.7 times the androgenic activity of methyltestosterone.

17β-hydroxy-5α-androstano(2,3-C)furazan had 1.2 to 1.6 times the myotropic and 0.2 times the androgenic activity of testosterone propionate when administered subcutaneously.

The anabolic hormone is useful for the treatment of cases which are caused by poor utilization of nitrogen. Generally, however, the anabolic hormone is usually accompanied by androgenic activity and, therefore, shows undesirable side effects. In this respect, the compounds of this invention can be said to be an extremely desirable anabolic agent because they have excellent anabolic activity and, at the same time, have weak androgenic activity. The following reaction formulas represent the production processes of the novel compounds of this invention:

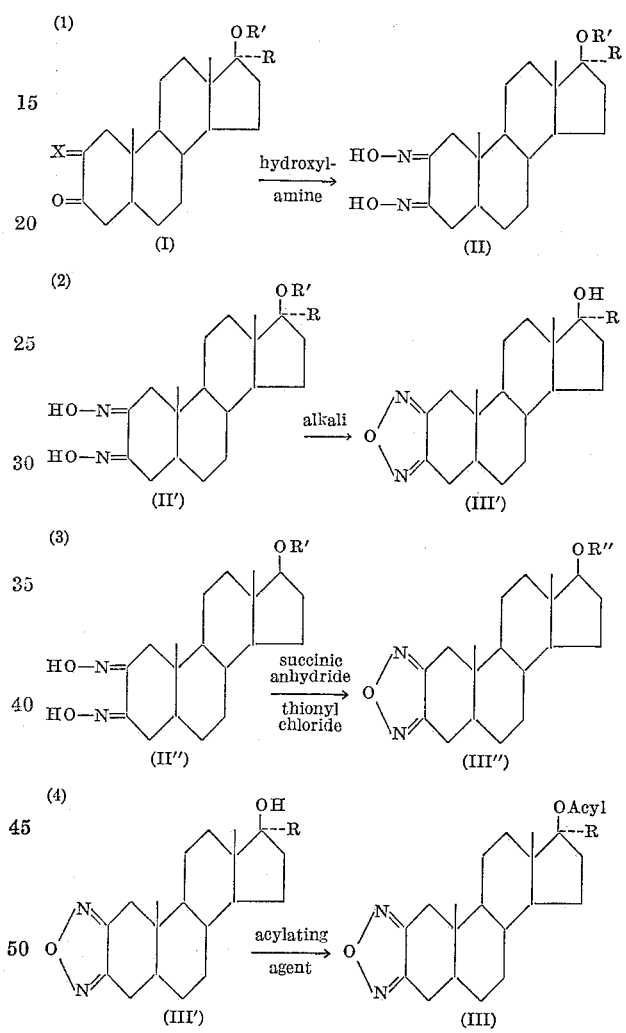

In the reaction Formulas 1, 2 and 4, X represents O or HON, and R and R' are the same designations as aforementioned. In the reaction formula 3, R' represents a hydrogen atom or the aforementioned acyl group when succinic anhydride is employed as a dehydrating agent, and represents the aforementioned acyl group when thionyl chloride is employed as a dehydrating agent; and R" represents COCH$_2$CH$_2$COOH when R' is a hydrogen atom, and succinic anhydride is used as a dehydrating agent, and represents the same as R' when R' represents the aforementioned acyl group. Furthermore, in the reaction Formula 4, the designation "Acyl" represents the same acyl group as defined in regard to R'.

The compound of the Formula I, wherein X represents HON, and R and R' are the same representations as defined in the reaction Formula 1, is produced by reacting 3-oxo-5α-androstane derivatives represented by the general formula:

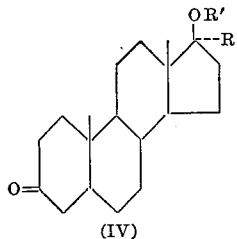

(IV)

wherein R and R' are the same representations as defined in the reaction Formula 1, with an alkyl nitrite in the presence of an alkali or an acid. In this case, an isoamyl nitrite or the like, known as a nitrosating agent, may be employed as an alkyl nitrite. As an alkali, an alkali alkoxide prepared from an alkali metal and a lower aliphatic alcohol, preferably potassium tertiary butoxide may be employed. When potassium tertiary butoxide is employed as an alkali in the reaction, it is preferable to carry out the reaction in a nitrogen atmosphere in order to prevent air-oxidation. As an acid, hydrogen chloride is preferably employed. When the compound of the general Formula IV wherein R' represents an acyl group is reacted in the presence of an alkali, hydrolysis of the acyl group generally occurs during the reaction or during the treatment after the reaction, and consequently the reaction product is inevitably contaminated with the compound of the general Formula I wherein R and R' represent H. Therefore, it is proper that the compound of the general Formula IV wherein R' represents an acyl group be reacted in the presence of an acid. This reaction is properly carried out at a temperature between −10° C. and 50° C. in a solvent that does not disturb the reaction. As a solvent, ether, benzene, toluene, lower aliphatic alcohol, or a mixture thereof is employed.

The compound of the Formula I, wherein X represents O, and R and R' are the same representations as defined in the reaction Formula 1, is produced by the method described by R. Camerino et al. in "Tetrahedron Letters," p. 554 (1961), and includes tautomeric isomers, any of which can be used without isolation.

The reaction of the Formula 1 is a process in which the compound of the general Formula I is reacted with hydroxylamine. In this process, it is preferable to use an alcohol or an aqueous alcohol as a solvent and to carry out heating at a temperature between room temperature and 100° C. under weak alkaline conditions. As an alcohol, for example, methanol, ethanol or tertiary butanol is employed. In order to maintain the reaction medium weakly alkaline, it is appropriate to carry out the reaction in the presence of pyridine, potassium acetate, or sodium acetate.

The reaction of the formula 2 is a process in which ring-closure under dehydration is effected by heating the compound of the general Formula II' in the presence of an alkali. In this reaction, it is appropriate to heat the compound of the general Formula II' in the presence of an alkali in a solvent that does not disturb the reaction. As the solvent, water, alcohols, hydro-carbons such as tetralin, and preferably ethylene glycol are employed. As the alkali, alkali hydroxide, alkali carbonate, alkali bicarbonate, ammonia, organic amines such as pyridine and piperidine may be employed, but the use of an alkali hydroxide or an alkali carbonate is preferable. When alkalis to be used are in liquid form, they also serve as a solvent. The reaction can be carried out at a temperature between 100° C. and 250° C. preferably between 160° C. and 190° C. The reaction can also be performed under increased pressure.

The reaction of the Formula 3 is a process in which the 2,3-dihydroxyimino-androstane compound of the Formula II'' is ring-closed by the use of a dehydrating agent selected from the group consisting of succinic anhydride and thionyl chloride. Generally, when a dehydrating agent acts on a hydroxyimino compound, it is well known that the Beckmann rearrangement occurs [Donaruma, Heldt: Organic Reactions, vol. 11, p. 1 (1960)]. When, however, the abovementioned dehydrating agent is employed, the furazan compounds can be produced smoothly without the rearrangement.

When the reaction is carried out by the use of succinic anhydride as a dehydrating agent, it is preferable to effect heating, at a temperature between 160° C. and 190° C. and to use a solvent that does not disturb the reaction. When the compound of the Formula II'', wherein R' is H, is reacted with succinic anhydride as a dehydrating agent, the product is a compound of the Formula III'', wherein R'' is $COCH_2CH_2COOH$.

When thionyl chloride is employed as a dehydrating agent, the reaction is preferably carried out in liquid sulfur dioxide. When thionyl chloride only or thionyl chloride in pyridine is employed, only a small amount of the desired furazan compound is obtained. It is appropriate to carry out the reaction at a temperature between −20° C. and −10° C. and to use as a starting material the compound of the Formula II'' wherein R' represents an acyl group.

In the above obtained compound of the general Formula III'', wherein R'' represents the acyl group, the acyloxy group or $-OCOCH_2 \cdot CH_2 \cdot COOH$ group thereof at the 17-position, if desired, can be converted into an OH group by saponification with an alkali.

The reaction of the Formula 4 is a process in which the compound of the Formula III' is acylated with an acylating agent. As the acylating agent, functional derivatives such as an acid chloride and an acid anhydride of an organic acid having less than 16 carbon atoms, for example, acetic acid, propionic acid, butyric acid, n-heptanoic acid, n-decanoic acid, palmitic acid, benzoic acid, phenylpropionic acid, cyclohexylpropionic acid and succinic acid, may be employed. The reaction is preferably carried out at a temperature between room temperature and 200° C. with or without a solvent that does not disturb the reaction. Ethyl ether, isopropyl ether, benzene, toluene, or pyridine can be employed as a solvent. When an acid anhydride of an organic acid is employed as the acylating agent, it is preferable to carry out the reaction in the presence of, for example, p-toluenesulfonic acid, sulfuric acid, perchloric acid, sodium acetate or pyridine. When an organic acid chloride is employed as the acylating agent, it is preferable to carry out the reaction in the presence of pyridine. In the case where the organic acid has a sufficiently high boiling point, the said organic acid can be used directly as the acylating agent by heating it with the compound of the Formula III' at a temperature between 160° C. and 200° C.

On the other hand, after the compound of the Formula III' is transformed into its magnesium compound, the aforementioned acid anhydride or acid chloride can be reacted with it to yield the compound of the Formula III. That is, the compound of the Formula III can be obtained by reacting the compound of the Formula III' with an alkyl magnesium halogenide such as ethyl magnesium bromide, and then reacting the magnesium compound thus obtained with the aforementioned acylating agent. Although the compound of the Formula III', wherein R represents a methyl group, has a tendency to undergo a dehydration reaction to yield a dehydrated by-product, this side reaction can be prevented by causing it to react with the acylating agent after it has been transformed into its magnesium compound.

The following specific examples serve to illustrate but are not intended to limit the scope of the invention.

I. PROCESS OF THE REACTION FORMULA 1

Example 1

A mixture of 0.76 g. of 2-hydroxyimino-17β-hydroxy-17α-methyl-5α-androstan-3-one, 0.23 g. of hydroxylamine hydrochloride, 5 ml. of pyridine and 15 ml. of ethanol was heated under reflux for two hours. After the resulting product was cooled, water was added thereto, and the separated product was filtered, washed with water, dried and recrystallized from methanol to produce 0.62 g. of 2,3 - dihydroxyimino - 17α - methyl - 5α - androstan - 17β-ol which has a melting point of 234°–235° C. (decomposition). $[\alpha]_D$ +63° (in pyridine). U.V. λ max. 238–241 mμ (ε 6600) (in ethanol).

Elementary analysis ($C_{20}H_{32}O_3N_2$): Theoretical (calculated): C, 68.93; H, 9.26; N, 8.04. Experimental: C, 69.15; H, 9.18; N, 7.98.

Example 2

A mixture of 0.93 g. of 17β-hydroxy-17α-methyl-5α-androstane-2,3-dione, 0.56 g. of hydroxylamine hydrochloride, 5 ml. of pyridine and 15 ml. of ethanol was heated under reflux for 2 hours. Subsequently, the reaction mixture was treated in the same manner as described in Example 1 to produce 0.62 g. of 2,3-dihydroxyimino-17α-methyl-5α-androstan-17β-ol.

Example 3

A mixture of 2.35 g. of 2-hydroxyimino-17β-hydroxy-5α-androstan-3-one, 0.7 g. of hydroxylamine hydrochloride, 5 ml. of pyridine and 100 ml. of methanol was heated under reflux for one hour. After the resulting product was cooled, separated crystals were filtered. The mother liquor was condenser, water was added thereto, and separated crystals were filtered, washed with water and dried. Crystals were collected and recrystallized from methanol to produce 2.31 g. of 2,3-dihydroxyimino-5α-androstan-17β-ol which has a melting point of 262°–263° C. (decomposition). $[\alpha]_D$ +72.4° (in pyridine). U.V. λ max. 239–240 mμ (ε 6300) (in ethanol).

Elementary analysis ($C_{19}H_{30}O_3N_2$) ( Theoretical (calculated): C, 68.23; H, 9.04; N, 8.38. Experimental: C, 68.46; H, 8.95; N, 8.54.

Example 4

A mixture of 0.87 g. of crude 17β-hydroxy-5α-androstane-2,3-dione, 0.42 g. of hydroxylamine hydrochloride, 1.0 g. of potassium acetate, 30 ml. of tertiary butanol and 2 ml. of water was heated under reflux for one hour, and thereafter condensed under reduced pressure. Water was added to the residue. After acidification with hydrochloric acid, the separated product was filtered and recrystallized from methanol to produce 0.42 g. of 2,3-hydroxyimino-5α-androstan-17β-ol.

II. PROCESS OF THE REACTION FORMULA 2

Example 5

A mixture of 2.0 g. of 2,3-dihydroxyimino-17α-methyl-5α-androstan-17β-ol, 0.5 g. of potassium hydroxide and 10 ml. of ethylene glycol was heated at a temperature between 180° C. and 190° C. for 30 minutes. After the resulting product was cooled, water was added thereto, and the separated product was filtered, washed with water and dried. The product was dissolved in benzene and passed through a column of alumina. The column was washed with ether, and the eluted fractions were collected and condensed. Subsequently, the residue was recrystallized from ether or aqueous methanol to produce 1.53 g. of 17β-hydroxy-17α-methyl-5α-androstano[2,3-C]furazan which has a melting point of 152° C. $[\alpha]_D$ +39.4° C. (in chloroform solution). U.V. λ max. 216–217 mμ (ε 4300) (in ethanol).

Elementary analysis ($C_{20}H_{30}O_2N_2$): Theoretical (calculated): C, 72.69; H, 9.15; N, 8.48. Experimental: C, 72.93; H, 9.48; N, 8.45.

Example 6

When 1.0 g. of sodium bicarbonate was used instead of 0.5 g. of potassium hydroxide in Example 5, 17β-hydroxy-17α-methyl - 5α - androstano[2,3-C]furazan was obtained with 60% yield.

Example 7

When 5 ml. of piperidine was employed instead of 0.5 g. of potassium hydroxide in Example 5, 17β-hydroxy-17α-methyl - 5α - androstano[2,3-C]furazan was obtained with a 58% yield.

Example 8

A mixture of 0.2 g. of 2,3-dihydroxyimino-17α-methyl-5α-androstan-17β-ol and 4 ml. of 5% aqueous solution of potassium hydroxide was heated under reflux for 10 hours. After the resulting batch was cooled, the separated product was filtered and thereafter treated in the same manner as described in Example 5 to produce 17β-hydroxy-17α - methyl - 5α - androstano[2,3-C]furazan with a 37% yield.

Example 9

A mixture of 1.37 g. of 2,3-dihydroxyimino-5α-androstan-17β-ol, 0.57 g. of potassium carbonate and 15 ml. of ethylene glycol was heated at a temperature between 180° C. and 190° C. for 30 minutes. The reaction mixture was condensed under reduced pressure, water was added thereto, and extraction was carried out with benzene. The benzene solution was washed with water, dried and passed through a column of alumina.. The column was washed with ether and the eluted fractions were collected and condensed. The residue was recrystallized from aqueous methanol to produce 0.84 g. of 17β-hydroxy-5α-androstano[2,3-C]furazan which has a melting point of 158°–159° CD. $[\alpha]_D$ +62.2 (in chloroform). U.V. λ max. 216–217 mμ (ε 4700) (in ethanol).

Elementary analysis ($C_{19}H_{28}O_2N_2$): Theoretical (calculated): C, 72.11; H, 8.92; N, 8.85. Experimental: C, 72.44; H, 8.80; N, 9.15.

III. PROCESS OF THE REACTION FORMULA 3

Example 10

A mixture of 0.30 g. of 2,3-dihydroxyimino-5α-androstan-17β-ol and 0.30 g. of succinic anhydride was heated at a temperature between 170° C. and 180° C. for 5 minutes. After cooling, the reaction mixture was subjected to extraction with chloroform, and chloroform was distilled off. Water was added to the residue, and the mixture was stirred and then subjected to extraction with ether. The ether soluble fraction was purified by means of chromatography with the use of 8 g. of "Florisil" (trade name for a synthetic absorbent of Floridin Co. in U.S.A.). The column was eluted with ether, then with chloroform and thereafter with chloroform-methanol (1:1). The fractions eluted with chloroform-methanol were collected and the solvent was distilled off. The residue was shaken with a mixture of 1% hydrochloric acid and ether. The ether layer was separated, washed with water and dried. Ether was distilled off to provide 0.135 g. of 17-succinic acid ester of crude 17β-hydroxy-5α-androstano[2,3-C]furazan. By recrystallization from ether-cyclohexane solution, a pure product which has a melting point of 146.5°–147.5° C. was obtained.

Elementary analysis ($C_{23}H_{32}O_5N_2$): Theoretical (calculated): C, 66.32; H, 7.74; N, 6.73. Experimental: C, 66.35; H, 7.58; N, 6.74.

Example 11

A mixture of 0.30 g. of 17-acetate of 2,3-dihydroxyimino-5α-androstan-17β-ol and 0.30 g. of succinic anhydride was heated at a temperature between 180° C. and 190° C. for 8 minutes. After cooling, the reaction mixture was dissolved in chloroform, washed with water and dried, and then chloroform was distilled off. The residue was purified by chromatography with the use of 11 g. of "Florisil." Subsequently, it was recrystallized from methanol to produce 0.14 g. of 17β-acetoxyandrostano[2,3-C]furazan, which has a melting point of 179°–180° C.

Elementary analysis ($C_{21}H_{30}O_3N_2$): Theoretical (calculated): C, 70.36; H, 8.44; N, 7.82. Experimental: C, 70.56; H, 8.30; N, 7.73.

*Example 12*

0.19 g. of 17-acetate of 2,3-dihydroxyimino-5α-androstan-17β-ol was added to 30 ml. of liquid sulfur dioxide cooled to −10° C., then 0.12 g. of thionyl chloride was added dropwise thereto. After liquid sulfur dioxide was distilled off at room temperature, the residue was dissolved in chloroform and washed with 5% sodium bicarbonate solution, then with water and dried. Chloroform was distilled off, and the residue was dissolved in benzene and purified by chromatography with the use of 3 g. of alumina. The fractions eluted with benzene-ether (9:1) were collected and recrystallized from methanol to produce 0.115 g. of 17β-acetoxy-5α-androstano[2,3-C]furazan which has a melting point of 179°–180° C.

IV. PROCESS OF THE REACTION FORMULA 4

*Example 13*

0.50 g. of 17β-hydroxy-5α-androstano[2,3-C]furazan was dissolved in 10 ml. of pyridine, and 3 ml. of acetic anhydride was added thereto, and the mixture was heated at about 100° C. for two hours. After the batch was cooled, water was added to the reaction mixture, and the separated product was filtered, washed with water, dried and recrystallized from methanol to produce 17β-acetoxy-5α-androstano[2,3-C]furazan, which has a melting point of 178.5°–179° C., with a yield of 98%. $[\alpha]_D$ +43° (in chloroform).

*Example 14*

In the same manner as described in Example 13, 0.62 g. of 17β-hydroxy-5α-androstano[2,3-C]furazan, 1.3 g. of propionic anhydride, and 10 ml. of pyridine were reacted to produce 0.61 g. of 17β-propionyloxy-5α-androstano[2,3-C]furazan, which has a melting point of 136°–137° C. $[\alpha]_D$ +43° (in chloroform).

Elementary analysis ($C_{22}H_{32}O_3N_2$): Theoretical (calculated): C, 70.93; H, 8.66; N, 7.52. Experimental: C, 70.89; H, 8.67; N, 7.63.

*Example 15*

A mixture of 0.60 g. of 17β-hydroxy-5α-androstano[2,3-C]furazan, 3 ml. of butyric anhydride, and 5 ml. of pyridine was heated at about 100° C. for 5 hours. After cooling, the reaction mixture was poured into water, and the separated product was filtered, washed with water, and dried. It was purified by chromatography on alumina and thereafter recrystallized from methanol to produce 0.62 g. of 17β - n - butyroyloxy - 5α-androstano[2,3-C]furazan which has a melting point of 89°–90° C. $[\alpha]_D$ +41.6° (in chloroform).

Elementary analysis ($C_{23}H_{34}O_3N_2$): Theoretical (calculated): C, 71.47; H, 8.87; N, 7.25. Experimental: C, 71.10; H, 8.78; N, 7.23.

*Example 16*

In the same manner as described in Example 15, 0.60 g. of 17β-hydroxy-5α-androstano[2,3-C]furazan, 3 ml. of 3-phenylpropionic acid anhydride as an acylating agent, and 5 ml. of pyridine were reacted to produce 0.70 g. of 17β - (3 - phenylpropionyloxy) - 5α - androstano[2,3-C]furazan, which has a melting point of 110°–111° C. $[\alpha]_D$ +45.7° (in chloroform).

Elementary analysis ($C_{28}H_{36}O_3N_2$): Theoretical (calculated): C, 74.97; H, 8.09; N, 6.25. Experimental: C, 74.85; H, 8.10; N, 6.19.

*Example 17*

In the same manner as described in Example 15, 0.40 g. of 17β-hydroxy-5α-androstano[2,3-C]furazan, 1.6 g. of n-heptanoic acid anhydride, and 5 ml. of pyridine were reacted to produce 0.37 g. of 17β-(n-heptanoyloxy)-5α-androstano[2,3-C]furazan, which has a melting point of 65°–66.5° C.

Elementary analysis ($C_{26}H_{40}O_3N_2$): Theoretical (calculated): C, 72.86; H, 9.41; N, 6.54. Experimental: C, 73.20; H, 9.44; N, 6.52.

*Example 18*

A mixture of 0.20 g. of 17β-hydroxy-5α-androstano[2,3-C]furazan and 0.40 g. of n-heptanoic acid was heated at about 190° C. for 2 hours. After the reaction mixture was cooled, water was added thereto, and the reaction mixture was neutralized with sodium carbonate. The separated product was filtered, washed with water, and purified by chromatography on alumina and thereafter recrystallized from ethanol to produce 17β-(n-heptanoyloxy)-5α-androstano[2,3-C]furazan with a 52% yield.

*Example 19*

In the same manner as described in Example 15, 0.50 g. of 17β-hydroxy-5α-androstano[2,3-C]furazan, 3 g. of n-decanoic acid anhydride, and 10 ml. of pyridine were reacted to produce 0.57 g. of 17β-(n-decanoyloxy)-5α-androstano[2,3-C]furazan, which has a melting point of 72°–73.5° C.

Elementary analysis ($C_{29}H_{46}O_3N_2$): Theoretical (calculated): C, 74.00; H, 9.85; N, 5.95. Experimental: C, 73.82; H, 9.65; N, 6.10.

*Example 20*

A mixture of 0.48 g. of 17β-hydroxy-5α-androstano[2,3-C]furazan, 0.83 g. of palmitoyl chloride, and 5 ml. of pyridine was allowed to stand at room temperature for about 16 hours. Water was added thereto, and the solution was acidified weakly. The separated product was filtered, washed with water, and purified by chromatography on alumina and thereafter recrystallized from ethanol to produce 0.67 g. of 17β-palmitoyloxy-5α-androstano[2,3-C]furazan, which has a melting point of 77°–78° C.

Elementary analysis ($C_{35}H_{58}O_3N_2$): Theoretical (calculated): C, 75.76; H, 10.54; N, 5.05. Experimental: C, 75.53; H, 10.50; N, 4.88.

*Example 21*

In the same manner as described in Example 20, 0.40 g. of 17β-hydroxy-5α-androstano[2,3-C]furazan, 1.0 g. of benzoyl chloride, and 6 ml. of pyridine were reacted to produce 0.4 g. of 17β-benzoyloxy-5α-androstano[2,3-C]furazan, which has a melting point of 239°–241° C.

Elementary analysis ($C_{26}H_{32}O_3N_2$): Theoretical (calculated): C, 74.25; H, 7.67; N, 6.66. Experimental: C, 74.05; H, 7.60; N, 6.71.

*Example 22*

A mixture of 0.33 g. of 17β-hydroxy-17α-methylandrostano[2,3-C]furazan, 8 ml. of acetic anhydride, and 2 ml. of pyridine was heated under reflux for an hour. Water was added, and the separated product was filtered, purified by alumina chromatography, and recrystallized from ether to produce 0.19 g. of 17β-acetoxy-17α-methylandrostano[2,3-C]furazan, which has a melting point of 167°–168.5° C.

Elementary analysis ($C_{22}H_{32}O_3N_2$): Theoretical (calculated): C, 70.93; H, 8.66; N, 7.52. Experimental: C, 70.96; H, 8.79; N, 7.35.

*Example 23*

0.33 g. of 17β-hydroxy-17α-methylandrostano[2,3-C]furazan was dissolved in a mixture of 5 ml. of acetic acid and 5 ml. of acetic anhydride, and 60 mg. of p-toluenesulfonic acid was added thereto. The reaction mixture was allowed to stand at room temperature for one and a half hours. Then, the reaction mixture was treated in the same manner as described in Example 22 to produce 0.15 g. of 17β-acetoxy-17α-methylandrostano[2,3-C]furazan.

*Example 24*

Grignard reagent was prepared from 15 ml. of ether, 72 mg. of magnesium, and 390 mg. of ethyl bromide. A solution of 0.33 g. of 17β-hydroxy-17α-methylandrostano[2,3-C]furazan in 15 ml. of ether was added thereto, and the mixture was stirred. Then, a mixture of 0.31 g. of acetic anhydride and 5 ml. of ether was added thereto, and the resulting mixture was stirred at room temperature for 2.5 hours, then heated under reflux for 2 hours, and finally allowed to stand at room temperature for 16 hours. Water was added thereto, and the ether layer was separated, washed with water, and dried. Ether was distilled off, and the residue was purified by chromatography to produce 17β-acetoxy-17α-methylandrostano[2,3-C]furazan.

*Example 25*

Grignard reagent was prepared from 20 ml. of ether, 120 mg. of magnesium and 0.71 g. of ethyl bromide. A solution of 0.66 g. of 17β-hydroxy-17α-methylandrostano[2,3-C] furazan in 40 ml. of ether was added thereto. Then, a solution of 0.46 g. of propionyl chloride in 5 ml. of ether was added. After reflux for 3.5 hours, the reaction mixture was allowed to stand at room temperature for 16 hours. The mixture was then treated in the same manner as described in Example 24 to produce 0.41 g. of 17β - propionyloxy - 17α-methylandrostano[2,3-C]furazan, which has a melting point of 130.5°–131.5° C.

Elementary analysis ($C_{23}H_{34}O_3N_2$): Theoretical (calculated): C, 71.47; H, 8.87; N, 7.25. Experimental: C, 71.47; H, 8.75; N, 7.47.

*Example 26*

Grignard reagent was prepared from 20 ml. of ether, 0.71 g. of ethyl bromide, and 0.21 g. of magnesium. A solution of 0.66 g. of 17β-hydroxy-17α-methylandrostano[2,3-C]furazan in 40 ml. of ether was added thereto. Then, a solution of 0.84 g. of 3-phenylpropionic acid chloride in 5 ml. of ether was added thereto. After reflux for 5 hours, the reaction mixture was allowed to stand at room temperature for 24 hours and then treated in the same manner as described in Example 24 to produce 0.56 g. of 17β-(3-phenylpropionyloxy)-17α-methylandrostano[2,3-C]furazan, which has a melting point of 165°–166° C.

Elementary analysis ($C_{29}H_{38}O_3N_2$): Theoretical calculated): C, 75.29; H, 8.28; N, 6.06. Experimental: C, 75.21; H, 8.50; N, 5.94.

*Example 27*

In the same manner as described in Example 20, 0.30 g. of 17β - (cyclohexylpropionyloxy)-5α-androstano[2,3-C]furazan was produced from 0.316 g. of 17β-hydroxy-5α-androstano[2,3-C]furazan, 0.40 g. of cyclohexylpropionyl chloride, and 6 ml. of pyridine. The product was amorphous powder, which has a melting point of 115°–117° C.

Elementary analysis ($C_{28}H_{42}O_3N_2$): Theoretical calculated): C, 73.97; H, 9.31; N, 6.16. Experimental: C, 73.27; H, 9.16; N, 5.93.

It should be understood, of course, that the foregoing disclosure relates to only particular examples of the invention and that it is intended to cover all changes and modifications of the examples of the invention herein chosen for the purposes of the disclosure, which do not constitute departures from the spirit and scope of the invention as set forth in the appended claims.

What is claimed is:
1. A compound of the following formula:

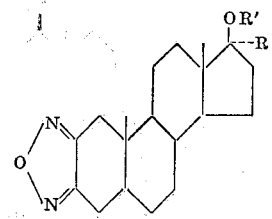

wherein R is selected from the group consisting of hydrogen and the methyl group; R' is selected from the group consisting of hydrogen and a hydrocarbon carboxylic acyl group containing less than 16 carbon atoms.

2. 17β-hydroxy-17α-methyl-5α-androstano[2,3-C]furazan.
3. 17β-hydroxy-5α-androstano[2,3-C]furazan.
4. 17β-succinate of 17β-hydroxy-5α-androstano[2,3-C]furazan.
5. 17β-acetoxy-5α-androstano[2,3-C]furazan.
6. 17β-propionyloxy-5α-androstano[2,3-C]furazan.
7. 17β-n-butyroyloxy-5α-androstano[2,3-C]furazan.
8. 17β-(3-phenylpropionyloxy)-5α-androstano[2,3-C]furazan.
9. 17β-(n-heptanoyloxy)-5α-androstano[2,3-C]furazan.
10. 17β(n-decanoyloxy)-5α-androstano[2,3-C]furazan.
11. 17β-palmitoyloxy-5α-androstano[2,3-C]furazan.
12. 17β-benzoyloxy-5α-androstano[2,3-C]furazan.
13. 17β-acetoxy-17α-methylandrostano[2,3-C]furazan.
14. 17β-propionyloxy-17α-methylandrostano[2,3-C]furazan.
15. 17β-(3-phenylpropionyloxy)-17α-methylandrostano[2,3-C]furazan.
16. 17β-(cyclohexylpropionyloxy)-5α-androstano[2,3-C]furazan.

17. A process for the production of a compound of the following formula:

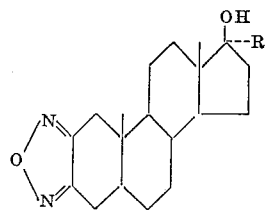

wherein R is selected from the group consisting of hydrogen and the methyl group, which process comprises cyclizing by heating in the presence of an alkali a compound of the following formula:

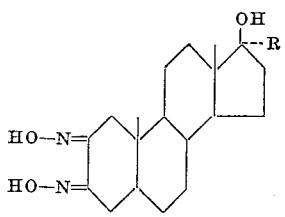

wherein R is defined as above.

18. A process for the production of a compound of the following formula:

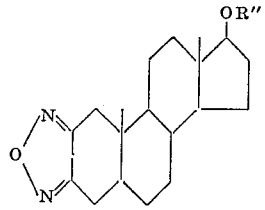

which comprises cyclizing by reacting a compound of the following formula:

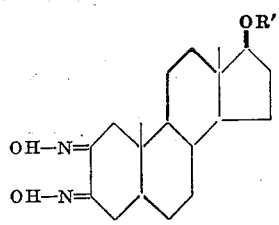

with a dehydrating agent selected from the group consisting of succinic anhydride and thionyl chloride, R' in the latter formula representing a member selected from the group consisting of hydrogen and a hydrocarbon carboxylic acyl group containing less than 16 carbon atoms; R" in the former formula representing $$COCH_2CH_2COOH$$

when R' is hydrogen and succinic anhydride is used as a dehydrating agent, and the same acyl group as R' when R' is the acyl group defined as above.

References Cited by the Examiner

Loewenthal: Tetrahedron, volume 6, No. 4, June 1959, pages 269–303, pages 299–302 relied on.

LEWIS GOTTS, *Primary Examiner.*